(12) United States Patent
Luff

(10) Patent No.: US 6,522,805 B1
(45) Date of Patent: Feb. 18, 2003

(54) OPTICAL MULTIPLEXER/DEMULTIPLEXER

(75) Inventor: Bradley Jonathan Luff, Southampton (GB)

(73) Assignee: Bookham Technology Limited, Oxfordshire (GB)

( * ) Notice: Subject to any disclaimer, the term of this patent is extended or adjusted under 35 U.S.C. 154(b) by 0 days.

(21) Appl. No.: 09/638,850

(22) Filed: Aug. 16, 2000

(30) Foreign Application Priority Data

Jan. 7, 2000 (GB) .............................................. 0000385

(51) Int. Cl.$^7$ ............................... G02B 6/26; G02B 6/42
(52) U.S. Cl. ............................... 385/30; 385/14; 385/37
(58) Field of Search .......................... 385/14, 37, 122, 385/30, 7, 24; 359/124, 127, 130

(56) References Cited

U.S. PATENT DOCUMENTS

| | | | |
|---|---|---|---|
| 4,909,584 A | | 3/1990 | Imoto et al. |
| 5,002,350 A | * | 3/1991 | Dragone ............... 359/124 |
| 5,457,758 A | * | 10/1995 | Snitzer ................ 385/30 |
| 5,499,308 A | | 3/1996 | Arai et al. |
| 5,629,992 A | * | 5/1997 | Amersfoort et al. ...... 385/15 |
| 5,636,300 A | * | 6/1997 | Keck et al. ............. 385/24 |
| 5,999,672 A | | 12/1999 | Hunter et al. |
| 6,091,870 A | * | 7/2000 | Eldada ................. 385/37 |
| 6,236,781 B1 | * | 5/2001 | Doerr et al. ........... 385/37 |

FOREIGN PATENT DOCUMENTS

| | | |
|---|---|---|
| EP | 0 859 249 A1 | 8/1998 |
| JP | 61-52604 | 3/1986 |
| WO | 95/12136 | 5/1995 |
| WO | 99/34539 | 7/1999 |

OTHER PUBLICATIONS

Patent Abstracts of Japan, vol. 015, No. 420, Oct. 24, 1991.

Meint K. Smit et al, "PHASAR–Based WDM–Devices: Principles, Design and Applications", IEEE Journal of Selected Topics in Quantum Electronics, vol. 2, No. 2, Jun. 1996, pp. 236–250.

Compact ploymeric wavelength division multiplexer Electronics Letters Jun. 24$^{th}$, 1999 vol. 35 No. 13 pp. 1074–1076 Fig. 1.

Multiband wavelength–division demultiplexing with a cascaded substrate–mode grating structure Applied Optics vol. 34 No. 25 Sep. 1, 1995 pp. 5582–5588 abstract and Figs. 1–4.

* cited by examiner

*Primary Examiner*—Hemang Sanghavi
*Assistant Examiner*—Scott A Knauss
(74) *Attorney, Agent, or Firm*—Sughrue Mion, PLLC

(57) ABSTRACT

An optical filter has at least one input waveguide, a wavelength dispersive device receiving light from the optical input, and an optical output having a plurality of spatially separated waveguides receiving respective wavelength bands of light from the wavelength dispersive device, at least one of the waveguides in the optical output or optical input forming part of an evanescent waveguide coupler comprising a group of coupled waveguides side by side.

30 Claims, 4 Drawing Sheets

OPTICAL MULTIPLEXER/DEMULTIPLEXER

FIELD OF THE INVENTION

The invention relates to optical multiplexers and demultiplexers and is particularly applicable to optical filters.

BACKGROUND OF THE INVENTION

Optical filters may comprise several input and output waveguides and a dispersive element such as a diffraction grating located between the input and output waveguides. Light consisting of multiple wavelengths may be input so as to interact with the dispersive element resulting in various frequency components coupling with different output waveguides. The arrangement may include focussing elements such as lenses or mirrors on either side of the dispersive element. The dispersive element which separates the light beam with respect to frequency may be an array of waveguides or etched mirror elements. Such optical filters can be used as multiplexers and demultiplexers in optical systems for combining or separating multiple frequencies of light in wavelength division multiplexed fibre optic communication systems. Such a prior art system is shown in FIG. 1 of the accompanying drawings.

The passband width and shape for each of the dispersed frequencies is important in multiplexer and demultiplexer components. To prevent significant light intensity fluctuations over the passband width of each of the output waveguides, a flattened profile within the passband may be desirable while maintaining a low level of cross talk between the different frequency channels. Wider separation between the output waveguides results in lower cross talk at the expense of narrower passband widths of each channel due to the higher spatial dispersion required. One prior art method of obtaining a flatter profile is the use of a multimode interference coupler of the type shown in the prior art arrangement of FIG. 2. In that case light of multiple wavelengths is input to an input waveguide 11, the light having a field profile of the type shown at 12. The input waveguide 11 may be a single mode waveguide or the profile 12 may represent that of the fundamental mode if the input waveguide is not single moded. In the coupler 13 multimode interference occurs causing an output field profile as shown at 14. When used in the general arrangement of FIG. 1, this results in a flatter field profile for each of the dispersed frequencies received in the output channels thereby reducing fluctuations in light intensity received by each output channel due to tolerance in frequency controls.

It is an object of the present invention to provide improved apparatus and methods for achieving broader and/or flatter passbands which may be used in optical multiplexers, demultiplexers and optical filters.

SUMMARY OF THE INVENTION

The invention provides an optical filter comprising at least one optical input for inputting multiple optical wavelengths, a wavelength dispersive device arranged to receive light from the optical input, and a plurality of optical outputs for receiving respective wavelength bands of light from the wavelength dispersive device, at least one of the optical outputs or optical input including at least two outer waveguides on either side of an inner waveguide, the outer and inner waveguides forming a group of coupled waveguides side by side, with the inner waveguide between the two outer waveguides such that evanescent coupling occurs between the outer and inner waveguides.

Preferably the outer waveguides are curved outwardly away from the inner waveguide at an end remote from the dispersive device thereby reducing the loss of the coupler.

Preferably the evanescent waveguide coupler including said inner and outer waveguides is located in said optical input, the inner waveguide being optically coupled to a light source of multiple wavelengths.

Preferably the waveguides of the or each evanescent waveguide coupler have an interaction length and separation to produce overlapping peaks of light intensity transverse to the optical path.

Preferably the outer waveguides are tapered outwardly at the end nearest the wavelength dispersive device thereby to provide a desired overlap of light intensity peaks for light coupled in the coupler.

Preferably said inner waveguide is a single mode waveguide device.

The wavelength dispersive device may include a dispersive grating.

The wavelength dispersive device may include a dispersive waveguide array.

Each optical output may include an inner waveguide coupled to the wavelength dispersive device via at least two outer waveguides on either side of the inner waveguide such that evanescent coupling occurs between the inner and outer waveguides, the two outer waveguides being arranged to receive respective parts of the dispersed output.

Preferably the input forms at least part of an integrated chip device.

The invention includes a method of multiplexing or demultiplexing optical signals by passing light of multiple wavelengths through an optically dispersive device located between input and output waveguides, at least one of the input or output waveguides forming part of an evanescent waveguide coupler comprising a group of coupled waveguides side by side such that optical coupling occurs between outer and inner waveguides of the group.

Preferably light of multiple wavelengths is filtered by a wavelength dispersive device, said method comprising inputting light to the wavelength dispersive device through an optical input and receiving light from the dispersive device through a plurality of spatially separated outputs, the optical input including at least two outer waveguides on either side of an inner waveguide, the outer and inner waveguides forming a group of coupled waveguides side by side, with the inner waveguide between the two outer waveguides such that the evanescent coupling occurs between the inner and outer waveguides.

Preferably each output provides a transmission variation with frequency which is flatter than a Gaussian distribution.

Preferably each output provides a transmission variation with frequency which is broader than a Gaussian distribution.

Figure 1:
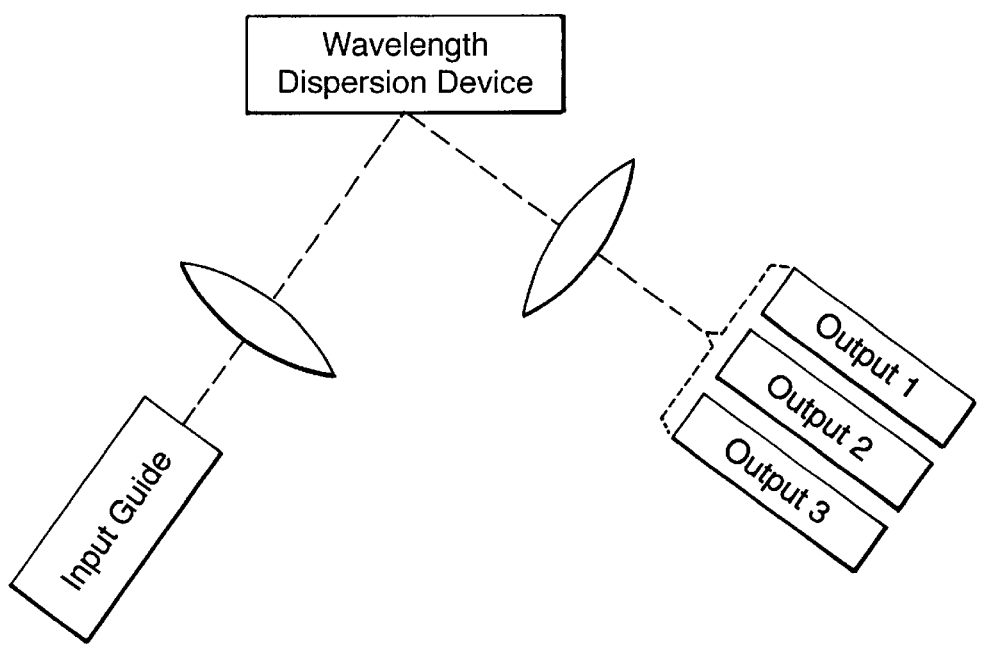
FIG. 1 shows a prior art optical filter.
Figure 2:
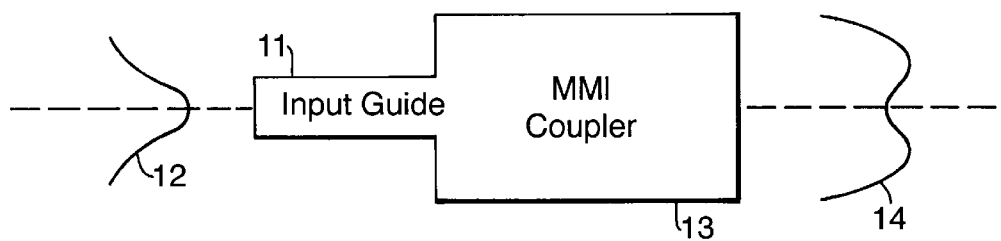
FIG. 2 shows a prior art input for an optical filter.

The prior art arrangements of FIGS. 1 and 2 have been described above.

DESCRIPTION OF THE PREFERRED EMBODIMENTS

Figure 3:
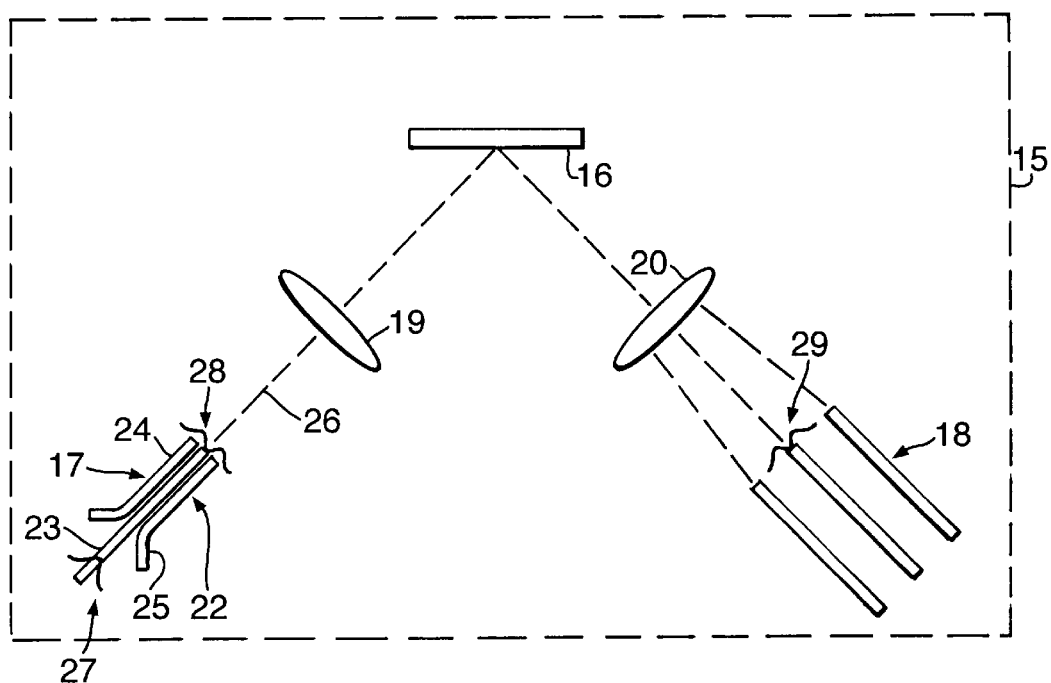
FIG. 3 shows one embodiment of the present invention.

In the embodiment of FIG. 3, an optical filter is provided for combining or separating multiple frequencies of light in a wavelength division multiplexed fibre optic communication system. The filter itself is formed as a single integrated chip device 15 formed in this example of silicon with a plurality of silicon rib waveguides formed on the chip as well as a wavelength dispersive device 16. In this example the dispersive device comprises an optical grating which may be formed by an array of waveguides in known manner or formed as etched mirror elements in the single integrated chip 15. The rib waveguides form an optical input 17 and an optical output 18. A focussing element, such as a lens or mirror is formed in the chip device both at position 19 between the input 17 and the grating 16 and at position 20 between the grating 16 and the output waveguides 18.

In use, light from a multiwavelength source is input through the input waveguide 17 and collimated by focussing element 19 onto the dispersive grating 16. The grating causes spatial distribution of different frequency channels and these are focussed by focussing element 20 into the output waveguides 18.

In this example output waveguides 18 comprise a plurality of spatially separated rib waveguides side by side, the number of waveguides corresponding to the number of output frequency channels. For convenience three output waveguides are shown. The input waveguides comprise a group forming an evanescent coupler 22. In this example the coupler comprises three parallel waveguides side by side with the central waveguide 23 leading to the edge of the chip 15 where it is coupled to an optical fibre input. Similarly the output waveguides 18 extend to the edge of the chip where they may be coupled to respective optical fibre outputs. The coupler 22 includes two outer waveguides 24 and 25 which extend along the central waveguide 23 for a required interaction length and with a required separation between the waveguides so as to produce overlapping peaks of light intensity transverse to the optical input path 26. Each of the outer waveguides 24 and 25 of the coupler 22 are curved away from the central waveguide 23 at the end of the coupler remote from the grating element 16 so as to avoid significant reflective losses in the input waveguides at the position where interaction occurs between the waveguides of the coupler.

Figure 4:
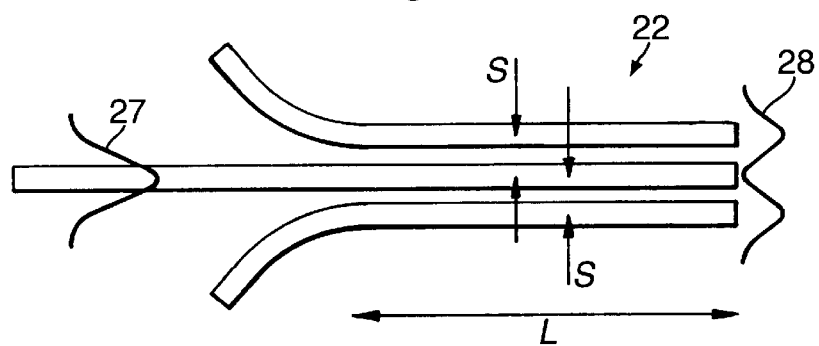
FIG. 4 shows on an enlarged scale part of the device of FIG. 3.

As is shown in FIG. 4, the central rib waveguide 23 is a single mode waveguide and has a field profile across the waveguide as shown by a single peak 27 entering the waveguide 23. By correct adjustment of the interaction length and separation within the coupler 22, the field profile of light emerging from the coupler is shown at 28 and comprises two overlapping peaks. This profile is duly dispersed into the separate frequency channels by the grating 16 causing the field profile of each passband entering the output waveguides 18 to have a broadened and flattened profile as shown at 29 entering the middle output waveguide 18. It will be appreciated that the spatial distribution caused by the grating 16 causes each of the output waveguides 18 to select a particular frequency passband. The separation of the output waveguides is arranged to avoid unwanted cross talk between the frequency channels and the broader, flatter field profile entering each of the output channels reduces variation in light intensity in each channel arising from tolerance of frequency control which may be required within the system.

Figure 7:
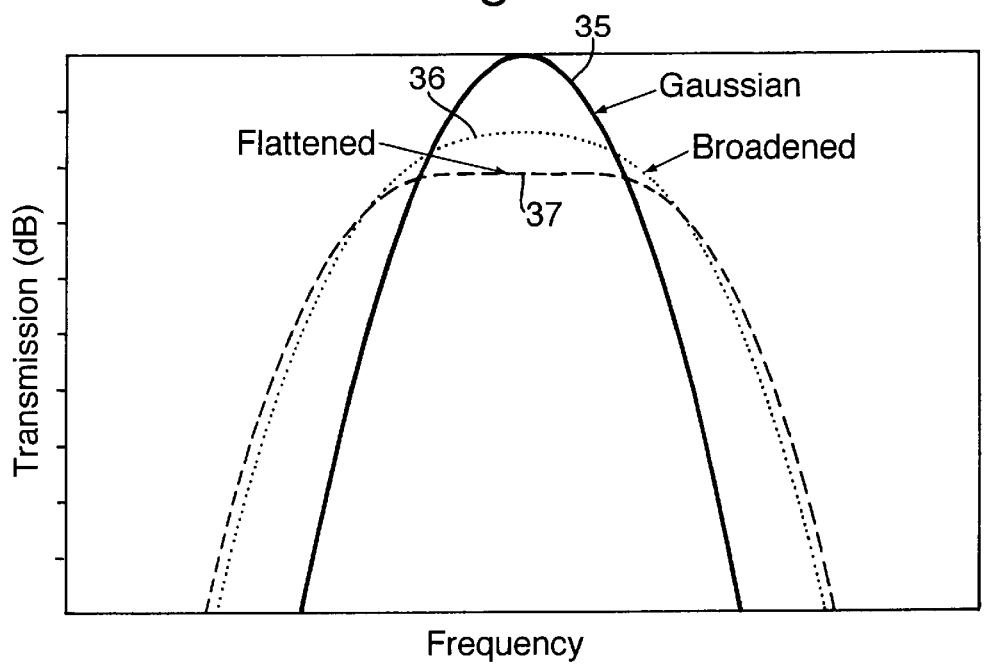
FIGS. 7 and 8 show passband profiles for the devices of FIGS. 3 to 6.
Figure 8:
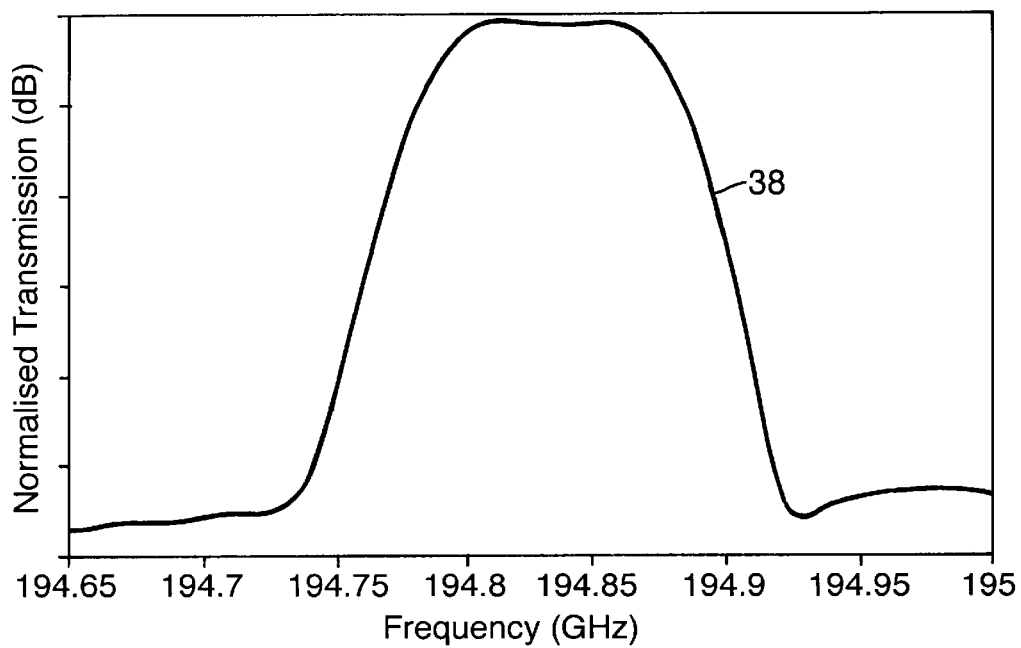

The flat topped transmission profiles obtained with use of the present invention can be seen more fully in FIGS. 7 and 8. FIG. 7 shows a normal Gaussian transmission profile 35 which may result from the device of FIG. 1. This may be broadened as shown at 36 to transmit a wider range of frequencies. The embodiment described flattens the top of this broader profile to give the frequency transmission profile shown at 37. FIG. 8 shows this flattened broader profile 38 with normalised transmission on the Y axis and frequency in GHz on the X axis.

The evanescent coupler 22 is shown in more detail in FIG. 4 where the electric field amplitude on the input side of the coupler is shown at 27 and the double peaked output is shown at 28. The separation between centres of adjacent waveguides 23, 24 and 25 is shown as S and the interaction length is shown as L. The values of L and S are chosen to achieve the desired broad double peak profile 28.

Figure 5:
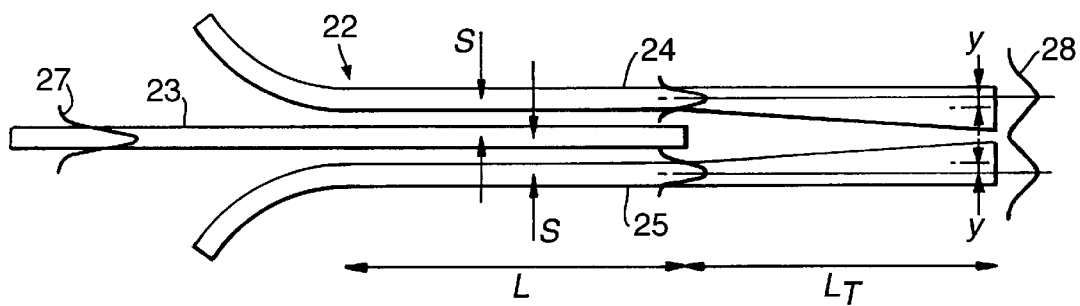
FIG. 5 shows an alternative arrangement for the part showing in FIG. 4 which may be used in accordance with the invention.

A modified form of the coupler 22 is shown in FIG. 5 and similar reference numerals have been used for similar parts. In this case the double peaked output profile 28 is broadened by using tapered waveguides in the coupler 22. For a particular waveguide separation S it may arise that when the waveguide mode is well confined then the double image at the output end of the coupler may consist of two distinctly separated spots. In such a case the outer waveguide 24 and 25 may be tapered so as to produce a tapered spread of light having its centre offset by distance Y from the axial centre of the waveguides 24 and 25. The use of such tapered waveguides 24 and 25 may then cause the overlapping double peak 28 as shown in FIG. 5.

Figure 6:
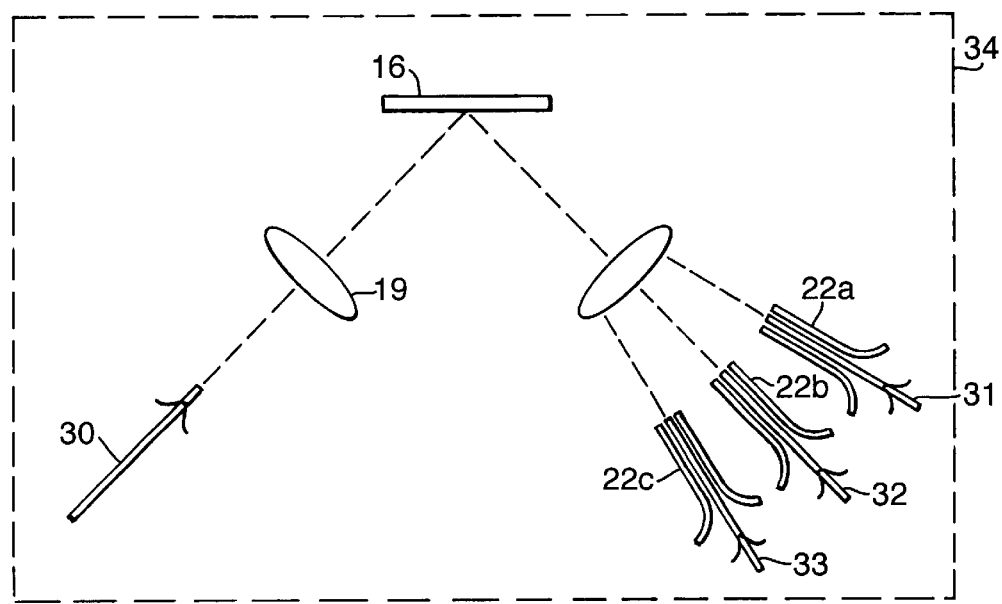
FIG. 6 shows a further embodiment of the invention.

It will be understood that the operation of light through a multiplexer or demultiplexer is reversible. Due to optical reciprocity an embodiment may be arranged as shown in FIG. 6 in which light having a single peaked field profile is input through a rib waveguide 30 and the spatially separated output frequency channels are received by three evanescent couplers 22a, 22b and 22c similar to the couplers previously described. In this case, the light is dispersed by the grating 16 acting on a single narrower peak but each output coupler is arranged to detect its output channel across the three waveguides forming each of the couplers. Due to the evanescent coupling within the coupler three single peaked outputs 31, 32 and 33 are output to connecting fibres at the edge of the single integrated chip 34.

The invention is not limited to the details of the foregoing example.

I claim:

1. An optical filter comprising at least one optical input for inputting multiple optical wavelengths, a wavelength dispersive device coupled to the at least one optical input to receive light therefrom, and a plurality of optical outputs coupled to the wavelength dispersive device for receiving respective wavelength bands of light from the wavelength dispersive device, at least one of the optical outputs or optical input including at least two outer waveguides on either side of an inner waveguide, the outer and inner waveguides forming a group of coupled waveguides side by side, with the inner waveguide between the two outer waveguides such that evanescent coupling occurs between said outer and inner waveguides.

2. An optical filter according to claim 1 in which the inner waveguide is also directly coupled to the wavelength dispersive device.

3. An optical filter according to claim 2 in which the outer waveguides are curved outwardly away from the inner waveguide at an end remote from the dispersive device.

4. An optical filter according to any one of the preceding claims in which at least one optical input includes an inner waveguide coupled to the wavelength dispersive device via at least two outer waveguides on either side of the inner waveguide such that evanescent coupling occurs between the inner and outer waveguides, the inner waveguide being optically coupled to a light source of multiple wavelengths.

5. An optical filter according to claim 1 in which the inner and outer waveguides have an interaction length and separation to produce overlapping peaks of light intensity transverse to the waveguides.

6. An optical filter according to claim 1 in which the outer waveguides are tapered outwardly at the end nearest the wavelength dispersive device thereby to provide a desired overlap of light intensity peaks.

7. An optical filter according to claim 1 in which said inner waveguide is a single mode waveguide device.

8. An optical filter according to claim 1 in which focussing means is located between the optical input and the wavelength dispersive device.

9. An optical filter according to claim 8 in which focussing means are located between the wavelength dispersive device and the optical output.

10. An optical filter according to claim 1 in which the wavelength dispersive device includes a dispersive grating.

11. An optical filter according to claim 1 in which the wavelength dispersive device includes a dispersive waveguide array.

12. An optical filter according to claim 1 in which each optical output includes an inner waveguide coupled to the wavelength dispersive device via at least two outer waveguides on either side of the inner waveguide such that evanescent coupling occurs between the inner and outer waveguides.

13. An optical filter according to claim 1 in which the at least one optical input forms at least part of an integrated chip device.

14. An optical filter according to claim 1 in which the plurality of outputs form at least part of an integrated chip device.

15. An optical filter according to claim 1 in which the input and outputs as well as the wavelength dispersive device are formed as an integrated chip device.

16. An optical filter according to claim 13 in which the chip device is a silicon chip device.

17. An optical filter according to claim 1 in which each of the optical outputs has a passband which has a transmission variation with frequency which is flatter and broader than a Gaussian distribution.

18. An optical filter according to claim 1, wherein the outer waveguides extend beyond the inner waveguide device toward the wavelength dispersive device.

19. An optical filter according to claim 1, wherein both the inner and outer waveguides extend uniformly to the wavelength dispersive device.

20. An optical filter according to claim 2 in which said inner waveguide of a group is a single mode waveguide device.

21. An optical filter according to claim 3 in which said inner waveguide of a group is a single mode waveguide device.

22. An optical filter according to claim 4 in which said inner waveguide of a group is a single mode waveguide device.

23. An optical filter according to claim 5 in which said inner waveguide of a group is a single mode waveguide device.

24. An optical filter according to claim 6 in which said inner waveguide of a group is a single mode waveguide device.

25. A method of multiplexing or demultiplexing optical signals comprising:

passing light of multiple wavelengths through an optically dispersive device which is coupled to at least one input and at least one output, at least one input or output including at least two outer waveguides on either side of an inner waveguide, the outer and inner waveguides forming a group of coupled waveguides side by side, with the inner waveguide between the two outer waveguides such that evanescent coupling occurs between said inner and outer waveguides.

26. A method according to claim 25 in which light of multiple wavelengths is filtered by a wavelength dispersive device, said method further comprising:

inputting light to the wavelength dispersive device through an optical input which is coupled to the dispersive device and receiving light from the dispersive device through a plurality of outputs which are coupled to the dispersive device, the optical input effecting evanescent coupling between a group of coupled waveguides located side by side.

27. A method of multiplexing or demultiplexing optical signals according to claim 25 in which each output provides a transmission variation with frequency which is flatter than a Gaussian distribution.

28. A method according to claim 25 in which each output provides a transmission variation with frequency which is broader than a Gaussian distribution.

29. A method according to claim 25, further comprising directly coupling only the outer waveguides toward the wavelength dispersive device.

30. A method according to claim 25, further comprising directly coupling both the inner and the outer waveguides toward the wavelength dispersive device.

* * * * *